(12) United States Patent
Holder et al.

(10) Patent No.: US 12,478,047 B2
(45) Date of Patent: Nov. 25, 2025

(54) COMBINED MIXED-CELL AND RACEWAY AQUACULTURE DEVICE, SYSTEM AND METHOD OF USE THEREOF, AND METHOD FOR GROWING FISH THEREBY

(71) Applicant: JLH CONSULTING INC., Courtenay (CA)

(72) Inventors: John Pearson Holder, Courtenay (CA); John Leslie Holder, Courtenay (CA)

(73) Assignee: JLH CONSULTING INC., Courtenay (CA)

( * ) Notice: Subject to any disclaimer, the term of this patent is extended or adjusted under 35 U.S.C. 154(b) by 0 days.

(21) Appl. No.: 17/865,694

(22) Filed: Jul. 15, 2022

(65) Prior Publication Data

US 2022/0346355 A1 Nov. 3, 2022

Related U.S. Application Data

(63) Continuation of application No. 17/595,278, filed as application No. PCT/CA2020/050649 on May 13, 2020, now Pat. No. 11,399,518.

(60) Provisional application No. 62/846,861, filed on May 13, 2019.

(51) Int. Cl.
*A01K 61/17* (2017.01)
*A01K 63/04* (2006.01)

(52) U.S. Cl.
CPC ............ *A01K 61/17* (2017.01); *A01K 63/042* (2013.01); *A01K 63/045* (2013.01)

(58) Field of Classification Search
CPC ..... A01K 61/17; A01K 63/042; A01K 63/045
See application file for complete search history.

(56) References Cited

U.S. PATENT DOCUMENTS

| | | | |
|---|---|---|---|
| 5,593,574 A | 1/1997 | Vantoever | |
| 5,799,612 A * | 9/1998 | Page | A01K 63/045 |
| | | | 119/260 |
| 6,722,314 B1 * | 4/2004 | Crisinel | A01K 63/042 |
| | | | 119/245 |

(Continued)

FOREIGN PATENT DOCUMENTS

| | | | |
|---|---|---|---|
| CA | 2200655 A1 * | 3/1997 | |
| CN | 202168405 U | 3/2012 | |
| CN | 206970406 U | 2/2018 | |

OTHER PUBLICATIONS

Betrand et. al, Foam fractionation efficiency of a vacuum airlift—application to particulate matter removal in recirculating systems, Oct. 2012, Elsevier, Aquacultural Engineering (Year: 2012).*

(Continued)

*Primary Examiner* — Katelyn T Truong
(74) *Attorney, Agent, or Firm* — ArentFox Schiff LLP (57) ABSTRACT

An energy efficient aquaculture system combining mixed-cell and raceway configurations. The system comprises a raceway tank, a raceway channel, a first water purification subsystem, and a second water purification subsystem. The system may include one or more of a hatching subsystem, a nursery subsystem, a feeding subsystem, a finishing subsystem, and a fish pumping system for transfer of fish between raceway tanks. A method of growing fish for commercial production using the aquaculture system is also provided.

9 Claims, 5 Drawing Sheets

(56) References Cited

U.S. PATENT DOCUMENTS

| | | | |
|---|---|---|---|
| 7,082,893 B2* | 8/2006 | Schreier | C02F 3/302 |
| | | | 119/260 |
| 7,527,730 B2* | 5/2009 | Johannsson | C02F 3/06 |
| | | | 119/260 |
| 8,622,225 B2 | 1/2014 | Goninan | |
| 10,034,461 B2* | 7/2018 | Holm | C02F 3/305 |
| 11,206,817 B2* | 12/2021 | Kemp | A01K 63/04 |
| 2008/0173249 A1 | 7/2008 | Miller | |
| 2011/0290191 A1 | 12/2011 | Boer et al. | |
| 2012/0117869 A1 | 5/2012 | Javan et al. | |
| 2013/0020266 A1* | 1/2013 | Timmons | C02F 3/085 |
| | | | 210/786 |
| 2016/0360715 A1 | 12/2016 | Sherlock et al. | |
| 2016/0362322 A1 | 12/2016 | Kuo | |
| 2018/0029902 A1 | 2/2018 | Andrews et al. | |
| 2019/0110447 A1 | 4/2019 | Nordahl-Pedersen | |
| 2019/0343091 A1 | 11/2019 | Weiner | |
| 2022/0039361 A1 | 2/2022 | Tracuks | |

OTHER PUBLICATIONS

Davidson, J., et al., Solids flushing, mixing, and water velocity profiles within large (10 and 150m3) circular 'Cornell-type' dual-drain tanks:, Aquacultural Engineering 32 (2004), pp. 245-271.

Labatut, R.A., et al., "Hydrodynamics of a Large-scale Mixed-Cell Raceway (MCR): Experimental studies", Aquacultural Engineering 37 (2007), pp. 132-143.

Timmons, M. B., et al., "Review of circular tank technology and management", Aquacultural Engineering 18 (1998), pp. 51-69.

Written Opinion and International Search Report issued by the International Search Authority in related International Patent Application No. PCT/CA2020/050649.

* cited by examiner

Angled Slats

FIG. 3A

Opposing Chevrons

COMBINED MIXED-CELL AND RACEWAY AQUACULTURE DEVICE, SYSTEM AND METHOD OF USE THEREOF, AND METHOD FOR GROWING FISH THEREBY

The present application a Continuation of U.S. patent application Ser. No. 17/595,278, filed Nov. 12, 2021, which is a National Stage entry of the International Application No. PCT/CA2020/050649, filed May 13, 2020, which claims priority to US Provisional Application No. 62/846,861 filed on May 13, 2019. The prior applications are incorporated herein by reference in their entirety.

FIELD OF THE TECHNOLOGY

Aspects of the present disclosure relate to a mixed-cell raceway aquaculture device, system, and methods of use thereof, and in particular, to aspects relating to increasing the efficiency of fish production using a raceway.

BACKGROUND

Rearing fish by aquaculture requires the ability to effectively remove from the water materials, such as uneaten feed or fecal matter. Consequences of a failure to remove this material include secondary production of ammonia, an increase in oxygen demand, and the development of suspended solids in concentrations that predispose fish to bacterial gill disease and other infections (see Watten B J et al., *Aquacultural Engineering* 24 (2000) 59-73). Linear raceways require water exchange at high rates making it imperative to reuse water. However, reuse is associated with disease transmission and formation of a gradient in dissolved oxygen and fish metabolites along the axis of the rearing unit (see Watten et al., 2000), resulting in increased fish mortality. Attempts to overcome these problems have included use of circular tanks, which allows for good self-cleaning and maintenance of optimal velocities for fish health and conditioning, leading to improved growth rates and food conversion efficiencies (Timmons, M B et al., *Aquacult. Eng.* 18 (1998) 51-69; Davidson, J. and Summerfelt, S. T., Aquacult. Eng. 32 (2004) 245-271; Labatut R A et al., *Aquacultural Engineering* 37 (2007) 132-143). Further improvements of the related art led to a raceway design in which linear raceways were modified to establish mixed flow reactor behavior (Watten et al., 2000). This design is known as the mixed-cell-raceway (MCR) and it combines the advantages of circular tanks and linear raceways, e.g., uniform water quality, rapid solids removal, and easier husbandry and maintenance in a single vessel design. The MCR design included vertical discharge manifolds along the sidewalls of the raceways converting linear raceways into a series of hydraulically independent mixed-cells. Each cell had a bottom-center drain that forced each cell to behave as an individual circular tank and a rotating hydraulic flow in a direction opposite to that of the adjacent cell.

SUMMARY

Notwithstanding the better designed MCR of the related art, there remains a need for improved methods for rearing fish, particularly with regard to increasing energy efficiency and cost effectiveness.

Aspects of the present disclosure provide an energy efficient mixed-cell raceway device, system, and methods of use thereof for rearing fish. In such device, system, and method, water may flow in and flow out through the two ends at the longitudinal extremities of the raceway tank and also through suitably placed drains at the bottom of the raceway, for example. This approach, among other advantages, leads to higher fish yield per unit of energy consumed relative to previous aquaculture systems.

Accordingly, in one aspect, the technology provides an aquaculture device, system, and method of use combining mixed-cell and raceway configurations. An example system in accordance with aspects of the present disclosure includes a raceway tank, a raceway channel, a first water purification subsystem, and a second water purification subsystem. The raceway tank may be configured as an elongated tank divided into a plurality of virtual circularly cross-sectionally shaped cells disposed along a longitudinal axis of the tank. The tank may have a first end and a second end disposed at opposite ends of the tank along the longitudinal axis. Further, the tank may be configured so that water enters the tank via flow thereof being directed via a first weir at the first end and flows under gravity toward the second end. A first portion of the water may exit through flow thereof being directed via a second weir at the second end and enter the first water purification subsystem. The tank may include a drain disposed at a center of each of the plurality of virtual cells. A second portion of the water may exit through the drains and enter the second water purification subsystem. Purified water from the first water purification subsystem may be lifted and enter the raceway channel, from which it may be gravity fed through the raceway channel, for example, and returned to the raceway tank via flow thereof being directed via the first weir. The purified water from the second water purification subsystem may be pumped through a plurality of discharge manifolds disposed along sidewalls of the tank so as to create a rotating hydraulic flow pattern in each of the virtual cells. The hydraulic flow patterns of adjacent virtual cells may include, for example, flows in at least partially opposing directions.

The aquaculture systems may have, for example, one or more of the following features. The raceway tank may have one or more moving bed bioreactors at the second end of the tank. The first and/or second water purification subsystem also may include one or more moving bed biofilm reactors (MBBRs). The first water purification subsystem may have a first filter for removal of solid material and the second water purification subsystem may have a second filter for removal of solid material. The system may further include a first pump for lifting water exiting the first water purification subsystem to a height of an entrance to the raceway channel. This pump may be a propeller-driven pump or be or include an airlift pump, for example, and be capable of lifting water to a height of about 25 cm to about 60 cm, or about 30 cm to about 60 cm, or about 45 cm to about 60 cm and be capable of providing a flow of about 12,500 gallons per minute per pump, for example. For example, the first pump may be capable of lifting 12,500 gallons of water per minute at 60 cm head while consuming 11 kW of power. Alternatively, an airlift subsystem may be used as the first pump; an airlift pump may use about 33% less energy than a propeller-driven pump and cost about 25% less. If greater flow capacity is needed, one or more first and/or second pumps may be added to the system. The second water purification subsystem may include a vacuum air lift. The subsystems may further include one or more surface aerators configured for degassing and oxygenating water in the raceway channel, which aerators may be located in the first water purification subsystem and/or in the second water purification subsystem. The systems may further include an oxygen supersaturation unit for enriching dissolved oxygen levels. The raceway tank may include 2-10 virtual cells. The systems may include two or more raceway tanks that are either (1) connected in parallel at their first ends to a single raceway channel, connected in parallel at their second ends to a single first water purification subsystem, and/or connected in parallel through their drains to a single second water purification subsystem; and/or (2) connected in parallel at their second ends to a single raceway channel, connected in parallel at their first ends to a single first water purification subsystem, and connected in parallel through their drains to a single second water purification subsystem. The system may include, for example, 2, 3, 4, 6, 8, 10, 12, 4-8, 6-10, 8-10, or 8-12 raceway tanks. The width to depth ratio of the tank may preferably be in the range of about 3:1 to about 4:1, for example. The length of the tank may preferably be approximately an integer multiple of the width, with the integer corresponding to the number of virtual cells in the tank. For example, if the tank is 24 feet wide, it may have length of multiples of 24 feet, depending on the number of virtual cells. The system may further include one or more of a hatching subsystem, a nursery subsystem, and/or a finishing subsystem. In an example implementation of either of the above described systems, a feeding subsystem may be added. In an embodiment of such a system, a fish pumping feature for transfer of fish among raceway tanks may be added. Either of the systems may be enclosed in a single building. In one example implementation, the total energy consumption of either one of the systems may be in the range of about 2.3 kWh/kg fish to about 3.3 kWh/kg fish. In an example implementation, the turnover rate of each raceway tank may be about 30 minutes to about 40 minutes. In an example implementation, one or more barriers disposed across the width of the tank may be added to the system, such that each barrier separates adjacent virtual cells that the barrier falls between and prevents light but not water from passing therethrough, thereby allowing a selected photoperiod regime to be sufficiently implemented, for example, in a section defined by two barriers and/or in a section defined by a barrier and a wall at a first or the second end of a tank. In one example implementation, the raceway tank comprises two barriers defining a section that includes one or more virtual cells located between the two barriers. In another example implementation, the raceway tank comprises a barrier and an end wall together defining a section comprising one or more virtual cells located therebetween.

In another aspect, the technology described herein may provide a method of growing fish for commercial production via an aquaculture system, the aquaculture system including two or more raceway tanks, a first water purification subsystem, a second water purification subsystem, and one or more finishing tanks. The method may include (a) introducing juvenile fish into a first raceway tank and allowing the fish to grow; (b) removing the fish once they have grown to a desired size or weight and transferring the fish to one or more unoccupied raceway tanks of the system; (c) optionally repeating step (b) one or more times; (d) removing the fish to one or more finishing tanks after they have reached a desired size or weight and purging the fish; and (e) harvesting the fish.

This method may alternatively or additionally include one or more of the following features. The method may further include, prior to step (a): providing a nursery subsystem comprising one or more circular cross-sectionally shaped single- or dual-drain tanks; and growing fingerlings into juvenile fish in the dual-drain tanks prior to transfer of the juvenile fish in step (a). In addition, the method may further include providing a hatchery subsystem comprising one or more tanks; and incubating fish eggs in the tanks and allowing the eggs to develop into fingerlings.

The method may include various features and/or steps such that essentially all of the water used in the system may be recycled after purification in the first and second water purification subsystems. Further, the water in the one or more raceway tanks may be exchanged every 20-40 minutes, for example. The method may include various features and/or steps such that when the system includes two or more raceway tanks, the quality of water entering all raceway tanks may be essentially the same or comparable at all times.

In another aspect, the devices, systems, and methods described herein may include a subsystem for water purification. This subsystem may comprise one or more filters for removing solid material, one or more pumps for lifting water, one or more surface aerators for exchange of gas dissolved in the water, and optionally one or more MBBRs, for example. The one or more pumps may lift water to a desired height either before or after the water has passed through the filter. The one or more surface aerators may degas the water after it has passed through the filter and optionally after it has passed through one or more MBBRs. The MBBRs may contact the water either before the water has passed through the filter but before the water contacts the one or more surface aerators, for example. The one or more pumps may be or include a propeller-driven pump and/or an airlift pump.

Aspects of the present disclosure may provide another subsystem for water purification. This subsystem may comprise one or more filters for removing solid material, a vacuum airlift, one or more surface aerators for exchange of gas dissolved in the water, and optionally one or more MBBRs. The one or more MBBRs may contact the water either before or after the water has passed through the filter but before the water contacts the one or more aerators, for example. The one or more surface aerators may degas the water after it has passed through the filter and optionally after it has passed through the one or more MBBRs, for example. The vacuum air lift may remove suspended particles with sizes in the range of about 0.3 μm to about 100 μm that have passed through the filter.

Additional advantages and novel features of these aspects will be set forth in part in the description that follows, and in part will become more apparent to those skilled in the art upon examination of the following or upon learning by practice of the disclosure.

DETAILED DESCRIPTION

An example aquaculture system in accordance with aspects of the present disclosure may include features combining mixed-cell and raceway configurations. The system may be more energy efficient compared to existing aquaculture systems. In this design, the bulk of water in the system may flow along the length of one or more individual raceway units, also interchangeably referred to herein as raceway tanks, such as in a laminar flow pattern. Water may enter one end of the tank and the bulk of the water may exit at another point, such as an opposite end, while the remaining water may exit through drains situated at the floor of the raceway tank. The drains may serve as center points of one or more additional, circular cross-sectional flow patterns within the overall laminar flow pattern of each raceway tank. Water exiting the raceway tanks may be purified before being introducing back into the tanks. In some example implementations, the water exiting the raceway tank may be lifted to a suitable height either before or after passing through the purification unit, such that the reintroduction of the water into the raceway tank may be performed efficiently under gravity. Before channeling the exited water back into the raceway tank, some or all of such exited water may be aerated to remove $CO_2$ and replenish oxygen. Water exiting the raceway tank through the drains may be collected in pipes and flow under gravity to an area where it may be purified and supersaturated with oxygen. This water may be reintroduced into the raceway tank, for example, through submerged jets.

Figure 1:
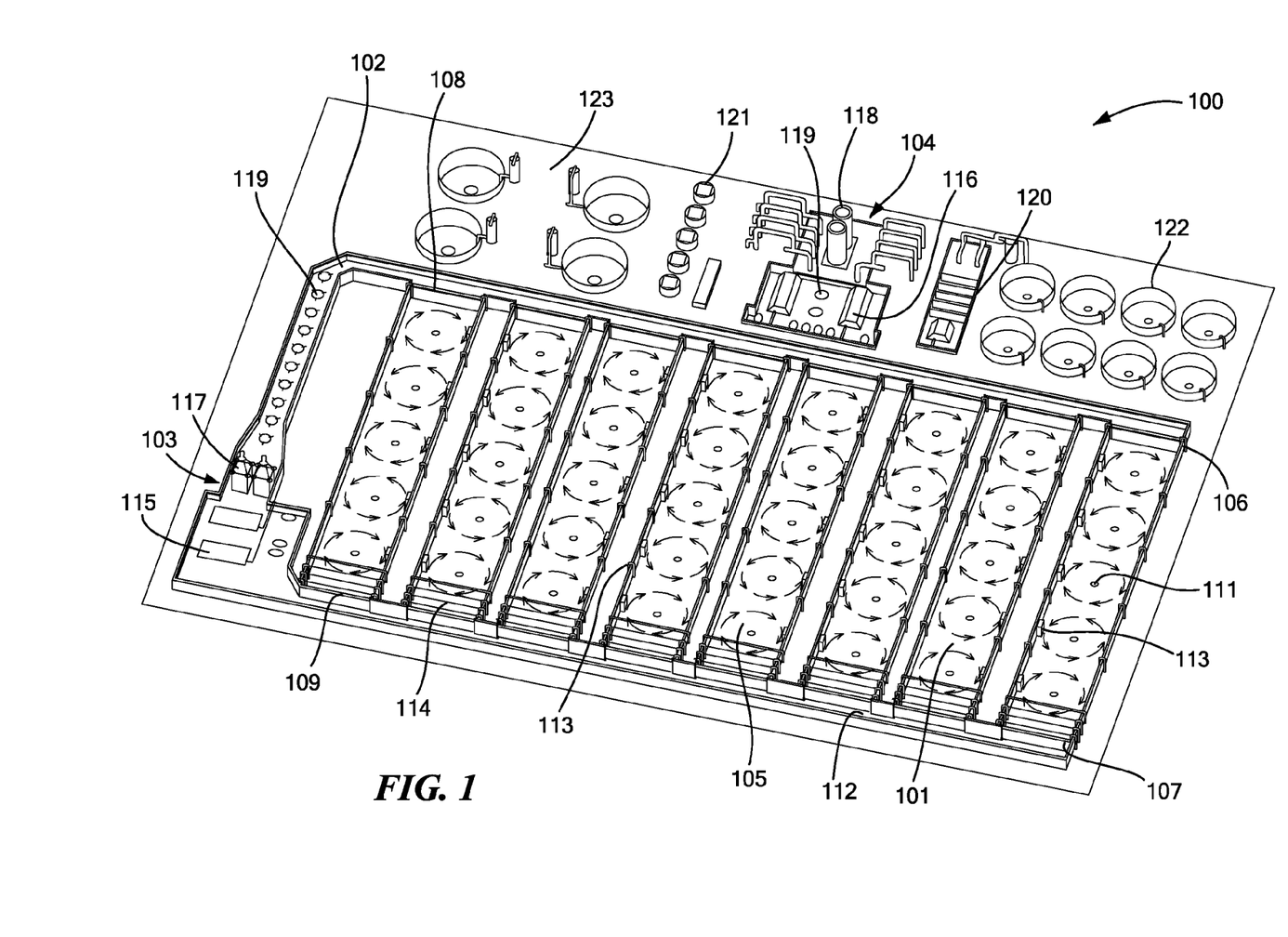
FIG. 1 is a schematic diagram of an embodiment of the aquaculture system in accordance with aspects of the present disclosure.

An example implementation of various features of an aquaculture system in accordance with aspects of the present disclosure is depicted in FIG. 1. The system 100 shown in FIG. 1 includes several raceway tanks 101, a raceway channel 102 for return of water to the tanks 101, such as after purification, a first water purification subsystem 103, a raceway channel 112 for conveying water exiting the raceway tanks to the first water purification subsystem 103, and a second water purification subsystem 104. Each raceway tank 101 may have an elongated overall cross-sectional area that encompasses one or more virtual cells 105 disposed along a longitudinal axis of the tank 101. Each tank 101 may have a first end 106 and a second end 107 disposed at opposite ends of the tank 101 along its longitudinal axial direction. Each tank 101 may be configured so that water enters the tank 101, for example, via a first weir 108 that communicates flow thereof with the first end 106 of the tank 101 and flows (e.g., via the action of gravity) toward the second end 107 of the tank 101. A portion of the water may exit the tank at the second end 107 via communication of flow thereof via a second weir 109 and flow through raceway channel 112 so as to enter the first water purification subsystem 103. This flow of water, prior to exiting via flow directed via the second weir 109 and entering the first water purification subsystem 103, may come into contact with one or more MBBRs 114. Microorganisms present in the bioreactors 114 may consume organic material present in the water and help purify the water. The floor of each tank 101 may have several drains 111 located therein, one of the drains 111 being disposed at the center of each of the of virtual cells 105, for example. The system 100 depicted in FIG. 1 shows an example of cylindrically shaped flows illustrated by pairs of circular cross-sectionally shaped arrows within five virtual cells per raceway tank 101, but each raceway tank may contain two or more, three or more, four or more, five or more, or from two to ten virtual such cells. A second portion of the water may exit the tank 101 via the drains 111 and be communicated to the second water purification subsystem 104.

Purified water from the first water purification subsystem 103 may be lifted and enter the raceway channel 102, from which the water may then be communicated (e.g., via gravity feed) via the raceway channel 102 back to the raceway tank 101 via the first weir 108. The purified water from the second water purification subsystem 104 may be pumped through multiple discharge manifolds 113, for example, disposed along the sidewalls of each tank 101 so as to produce a rotating hydraulic flow pattern in each of the virtual cells, the hydraulic flow patterns of adjacent virtual cells having at least components of their flow patterns extending in opposite directions to one another (e.g., at outer edges of flows where proximal to one another).

Raceway channels 102 and 112 may be open, i.e., the water flowing in the channel may be exposed to atmosphere, or alternately closed, such as by being contained within a flow conveying pipe or culvert.

In some embodiments adjacent raceway tanks 101 of the aquaculture system 100 may be separated from one another so as to form a passage therebetween that may be accessible by workers, for example, such as when tending to fish in the tanks 101 or when tending to the care of the tanks 101 themselves.

The first water purification subsystem 103 may comprise a first filter 115 for removal of solid material, and the second water purification subsystem 104 may include a second filter 116 for removal of solid material, for example. A first pump 117 may lift, for example, water exiting the first water purification subsystem 103 to a sufficient height such that the flow of water may communicate with an entrance to the raceway channel 102. The second water purification subsystem 104 may further comprise a vacuum air lift 118, for example.

The system 101 may further includes one or more surface aerators 119 configured for degassing and oxygenating water contained in the raceway channel 102, in the first water purification subsystem 103, and/or in the second water purification subsystem 104. Another pump, e.g., a centrifugal pump (not shown in FIG. 1), or other flow directing device, may be used to deliver the water leaving the second purification subsystem 104 to an oxygen supersaturation unit 120, for example. Oxygen supersaturated water may then exit the unit 120 and be delivered to the tanks 101, such as via through the manifolds 113.

The system 100 may also include a hatching subsystem 121, nursery subsystem 122, and/or finishing subsystem 123.

The first water purification subsystem 103 may include a filter 115 for removal of solid materials, such as a rotary vacuum drum filter (RVDF) that may effectively remove suspended solid material (e.g., fish fecal matter and/or uneaten feed). Multiple RVDFs may be used, depending upon the volume of water to be filtered. The pumps 117 in the subsystem 103 may lift the water either before or after purification. The pump or pumps 117 may be or include one or more propeller driven pumps, for example. An example propeller driven pump suitable for use in the system is a pump sold by AgriMarine Technologies Inc. (ATI), Canada, which may lift 12,500 gpm of water up to 60 cm using only 11 kWh. Alternatively, pump 117 may be an airlift pump, for example. The airlift pump may inject compressed air at the bottom of a discharge pipe immersed in the water. The compressed air may then mix with the water, causing the lighter air-water mixture to rise upwards. An airlift pump may generally have the advantage of being more energy-efficient and less capital intensive than other types of pumps, for example.

The second purification subsystem 104 may include a filter 116 for removal of solid materials. Water purified in this subsystem may include water exiting the drains 111 in each raceway tank 101, the bottom flow of which may be directed via pipes and flow thereof, such as may be caused by gravity, for example, to subsystem 104. As with the first purification subsystem 103, filter 116 in subsystem 104 also may be or include a RVDF. Subsystem 104 may include a vacuum air lift 118 for separating suspended solids or liquids from the water. The vacuum airlift 118 may assist in extraction of particles having a size of about 0.3 µm to about 100 µm and also other substances, such as oil and hydrocarbons. A vacuum airlift 118 generally operates by raising water in a column using vacuum, which may cause the water to bubble. The bubbles may trap the particles and appear in the form of foam at the top of the water column. The foam may then be removed and the process repeated. The use of vacuum airlift may also lead to stripping of $CO_2$. Subsystem 104 may also include one or more MBBRs 114 for removal of gas, such as ammonia, as well as one or more surface aerators 119.

The system may further include an oxygen supersaturation unit or an oxygen contactor unit 120 for oxygenating water exiting the second purification subsystem 104 before it is introduced into the raceway tank 101. Generally, an oxygen contactor includes a closed cylinder through which water is passed while being contacted with oxygen applied at a pressure. A high degree of saturation, e.g., up to 700%, may be achieved at medium pressures, e.g., 1.5 bar. An example oxygenator that may be used in the system described herein is the Oxyflow®, made by Aquacare Environment, Inc., of Bellingham, WA, which is a low head oxygenator that operates in a sealed vessel, thus not breaking head pressure. Water may enter the top of the unit under mild pressure of about 0.3 bar. The water may next pass through a horizontal drilled plate with specially shaped orifice holes (number and size determined by flow rate required) which may jet the water downward though an oxygen atmosphere approximately 20 cm depth. When the jets strike the water surface below, they may cause a high turbulence and create a bubble cloud of pure oxygen that extends downwards to 40 cm below the surface of the water. These buoyant bubbles flow upwards, counter to the downward water flow, in such a way that the downward velocity is not strong enough to carry the bubbles out of the chamber, hence the only way the oxygen gas may escape the OxyFlow® unit is upon becoming dissolved in the water. Bubbles that break the water surface inside the unit may again be subjected to the turbulence of the downward jets until they become dissolved. A small amount of nitrogen gas that remains in the oxygen rich atmosphere may be vented off to prevent it from becoming dissolved in the water. In this manner, gaseous oxygen may be converted into dissolved oxygen in a reliable and cost-effective way.

The pressure the water is under in the oxygen supersaturation unit 120 may force the water through the jets in the submerged manifolds 113. As mentioned above, water may be delivered to the to oxygen supersaturation unit 120 by means of a pump, e.g., a centrifugal pump (not shown in FIG. 1).

In one embodiment, about 50%-80% of the water entering the raceway tank 101 at the first end 106 may exit through the second end 107, and about 20%-50% of the water may exit through the drains 111 at the bottom of the tank 101. In another embodiment, about 70% of the water entering the raceway tank 101 at the first end 106 may exit through the second end 107, and about 20%-50% of the water may exit through the drains 111.

The ratio of the width to the depth of the raceway tank 101 may vary between about 3:1 to about 4:1. The length of the raceway tank 101 may be about 40 feet to about 200 feet long.

Figure 2:
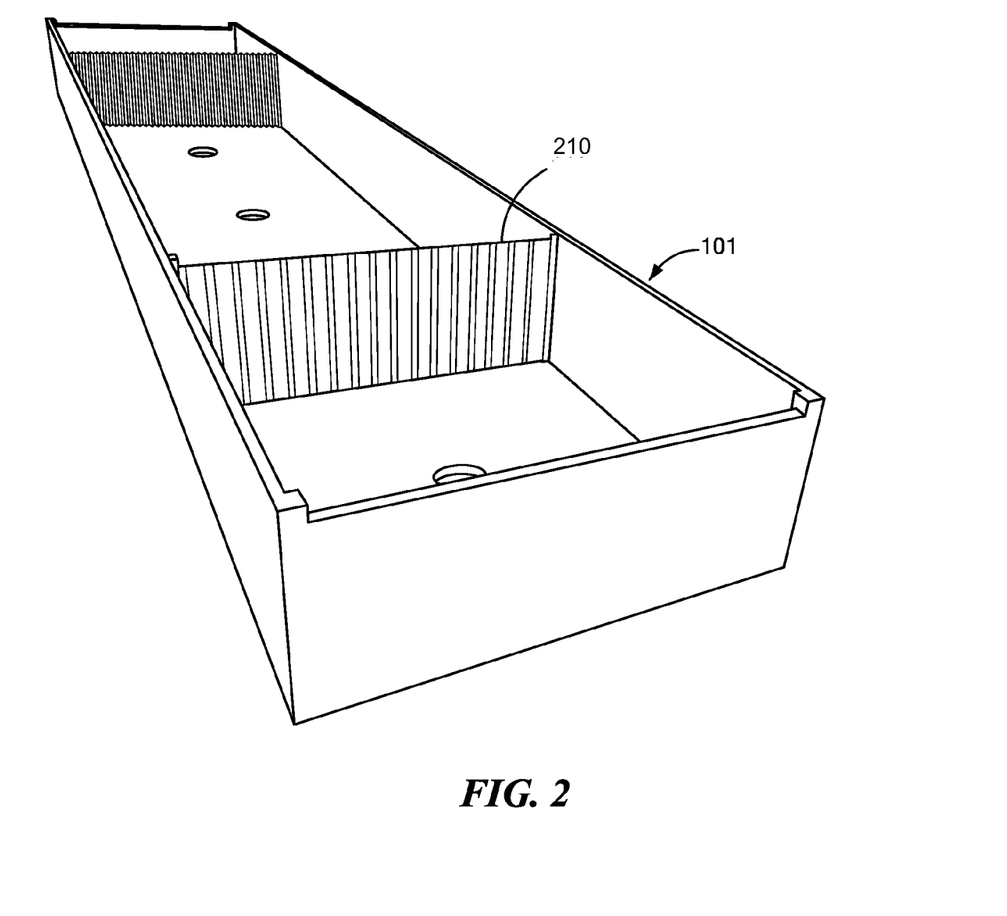
FIG. 2 shows an example tank having two barriers located therein, in accordance with aspects of the present disclosure.

As shown in FIG. 2, one or more of the raceway tanks 101 may further include one or more barriers 210 disposed across the width of the tank 101, and each barrier 210 may separates adjacent virtual circular cells (as shown in FIG. 1) and prevent light but not water from passing therethrough, thereby allowing, for example, a particular photoperiod regime to be implemented in a section defined by two barriers or by a barrier and either the wall defining the first or the second end. The barriers may also be interchangeably referred to herein as photon deflectors.

Photoperiod plays an especially important role in the rearing of a terminal spawning fish, such as Coho salmon. To achieve maximum growth and delay maturation, the fish need to experience a rigid photoperiod regime. For example, if the fry are not smolted, the entire growing period may be disrupted, resulting in poor growth and erratic maturity. There are three distinct photoperiod (PP) regimes, namely, smolting, growth spurt, and maturing. An example of a photoperiod protocol applied from first feeding to smolting, and finally from the growth spurt (overwintering) to market is shown in the Table below.

TABLE

| Photoperiod (approximate timelines) | | | | | |
|---|---|---|---|---|---|
| eyed eggs and alevins | 1$^{st}$ feeding fry-5 grams | 5 grams-30 grams | 30-700 grams | 700-1200 grams | 1.2 kilos-market |
| 0:24 L:D | 16:8 L:D 6 weeks PFF | 24:0 L:D 12 weeks PFF | 16:8 L:D 40 weeks PFF | 8:16 L:D 46 weeks PFF | 24:0 L:D 64 weeks PFF |

PFF—post first feeding,
L:D (light:darkness)

By utilizing the barrier or the photon deflector, the raceway may be divided along the circular cells, enabling more efficient utilization of the growing space. As the fish grow, the deflector may be moved along the raceway to bring an increasing number of cells under use, thereby enabling utilization the cells to their full potential and increasing the efficiency of the raceway.

Figure 3A:
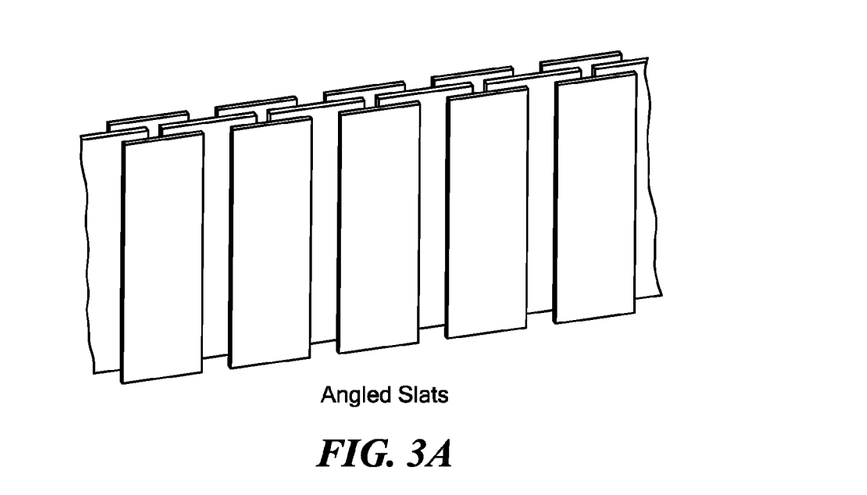
FIG. 3A shows various features of an example barrier/photon deflector for use in a raceway tank of an example aquaculture system in accordance with aspects of the present disclosure.
Figure 3B:
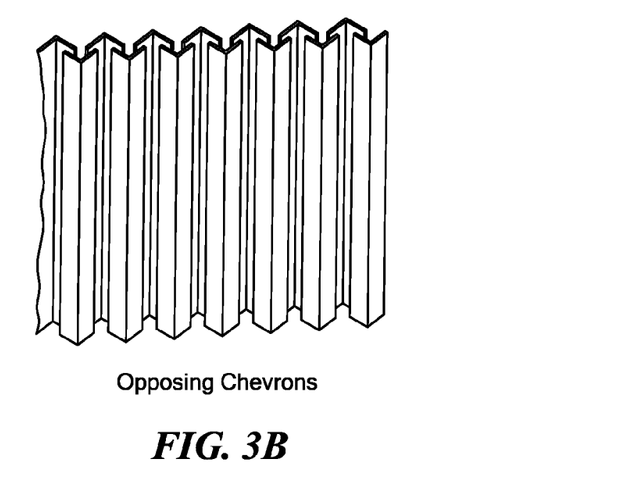
FIG. 3B shows a second example barrier/photon deflector for use in accordance with aspects of the present disclosure.

In one embodiment, the aquaculture system may comprise two barriers/photon deflectors defining a section comprising one or more virtual cells between the two barriers (FIG. 3A). Varying designs may be used to construct the photon deflectors. For example, the photon deflector may have angled slats or opposing chevrons as shown in FIG. 3B.

In another example implementation, the aquaculture system may comprise one barrier defining a section comprising one or more virtual cells located between the barrier and a wall of the tank at the first end or the second end.

Figure 4:
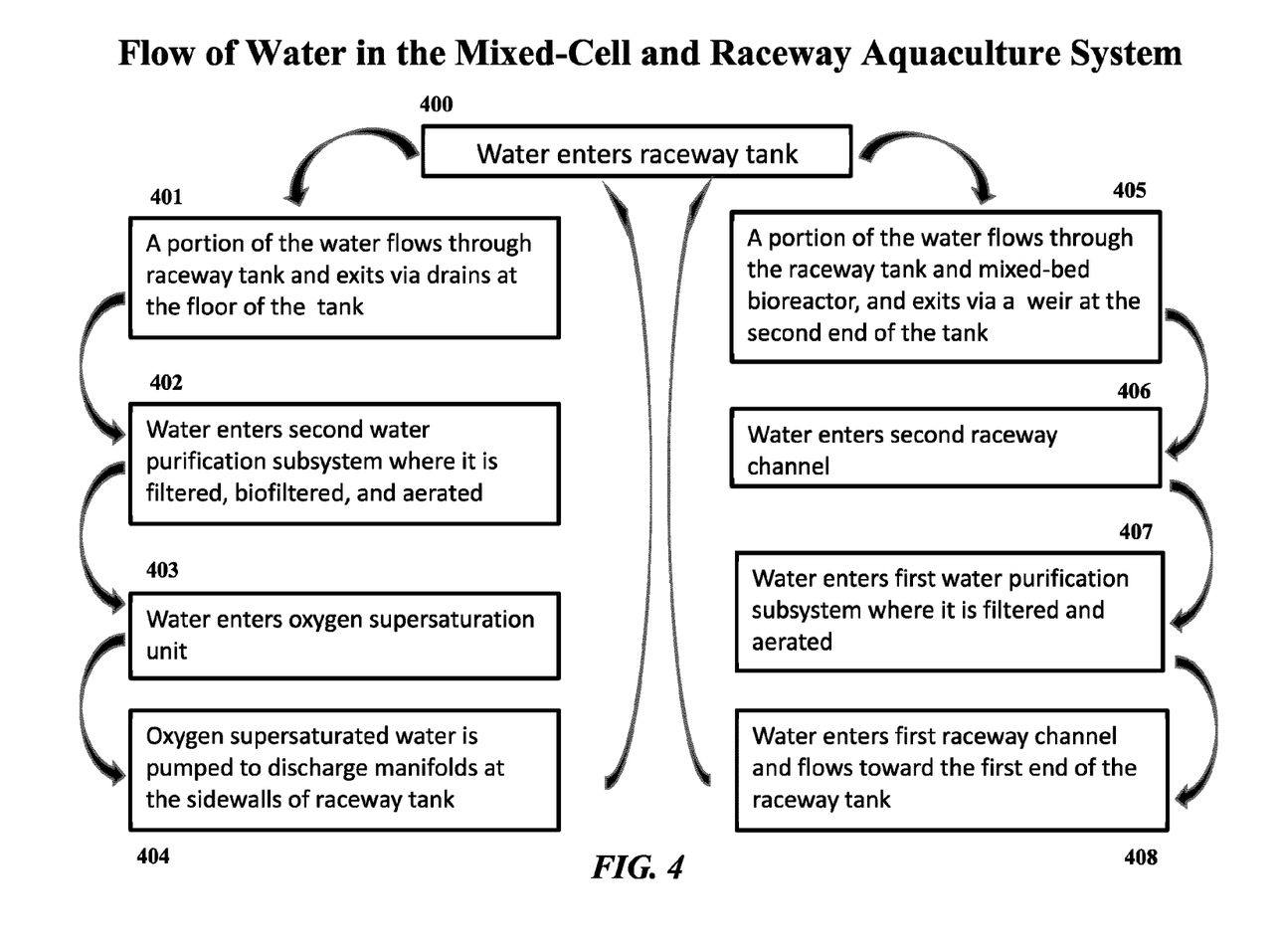
FIG. 4 is a flowchart showing a process of flow of water within an example aquaculture system in accordance with aspects of the present disclosure.

A flowchart of an example process for flow of water through an aquaculture system along the lines discussed above is shown in FIG. 4. Water enters the raceway tank from the first raceway channel at one end of the tank (400). A portion of this water flows through the tank and exits via drains at the floor of the tank (401). This water enters the second water purification subsystem where it is filtered, biofiltered (using MBBR), and aerated (402). The filtered and aerated water enters the oxygen supersaturation unit (403). Next, the oxygen supersaturated water is pumped to discharge manifolds at the sidewalls of the tank (404). Another portion of the water entering the raceway tank (400) flows through the tank and MBBR, and exits via a weir at the second end of the tank (405). This water enters the second raceway channel (406). Water flows through the second raceway channel and enters the first water purification subsystem where it is filtered and aerated (407). This filtered and aerated water enters the first raceway channel and flows toward the raceway tank (408) to enter the tank again (400).

Figure 5:
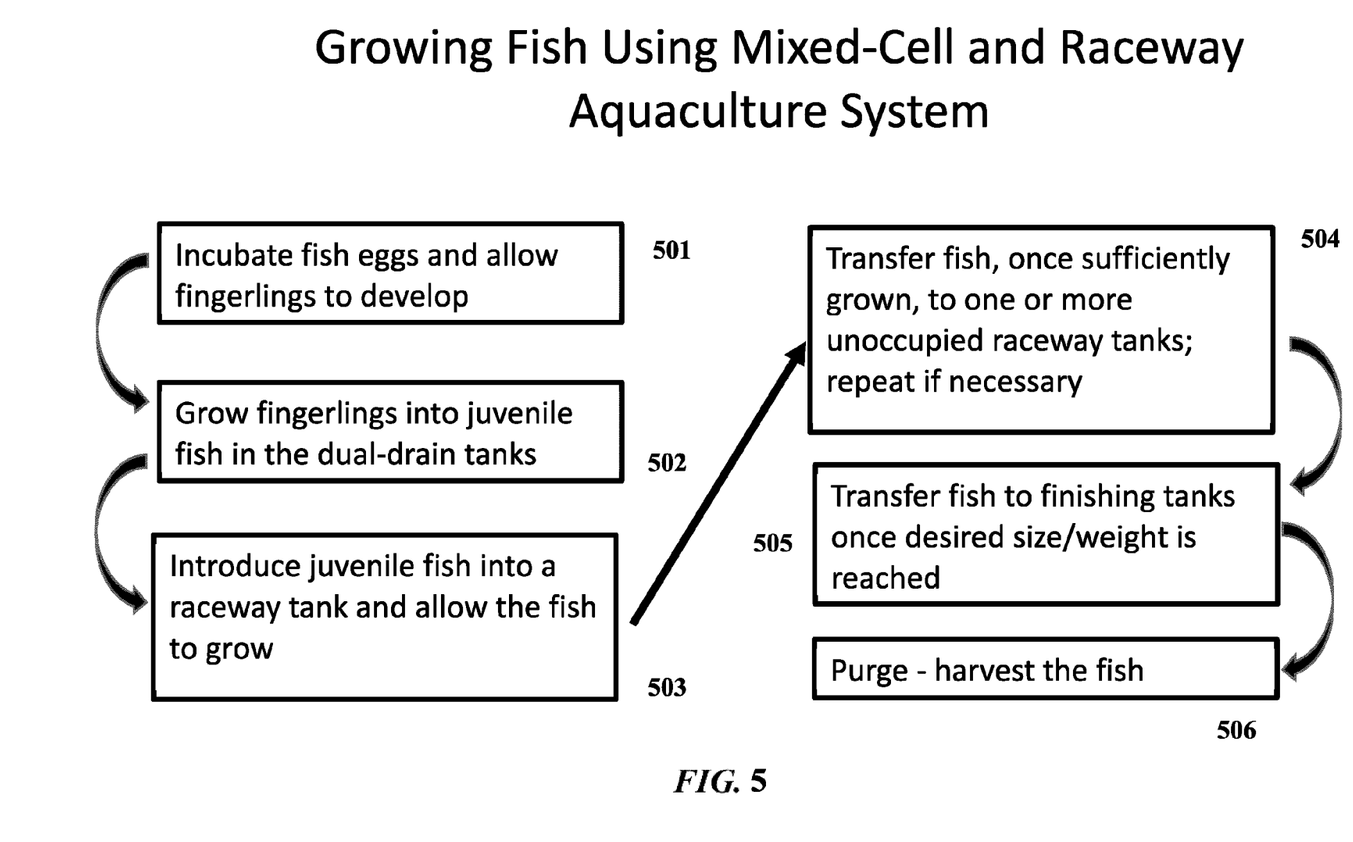
FIG. 5 is a flowchart depicting elements of a process of growing fish using an example aquaculture system in accordance with aspects of the present disclosure.

A flowchart of an example process for growing fish using an example aquaculture system along the lines discussed above is shown in FIG. 5. Initially, fish eggs are incubated and allowed to develop into fingerlings (501). Fingerlings are allowed to grow into juvenile fish in the dual-drain tanks (502). Next, the juvenile fish are introduced into a raceway tank and allowed to grow (503). Thereafter, once sufficiently grown, the fish are transferred to one or more unoccupied raceway tanks, and this portion of the process is repeated, as necessary (504). Next, once desired size/weight is reached, the fish are transferred to finishing tanks (505). Finally, the fish are purged and harvested (506).

OTHER ALTERNATIVES

For the convenience of the reader, the above description has focused on a representative sample of all possible embodiments, a sample that teaches the principles of the present disclosure and conveys the best mode contemplated for carrying it out. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

What is claimed is:

1. A subsystem for water purification, comprising:
one or more filters for removing solid material;
one or more pumps for lifting water;
one or more aerators for exchange of gas dissolved in the water;
one or more raceway tanks;
one or more moving bed bioreactors; and
an oxygen supersaturation unit configured to oxygenate the water leaving the water purification subsystem by applying oxygen to the water leaving the water purification subsystem at a pressure below 1.5 bar;
wherein the one or more pumps are configured to lift the water through a desired height either before or after the water has passed through at least one of the one or more filters,
wherein the one or more aerators degas the water after it has passed through the at least one of the one or more filters and through the one or more moving bed bioreactors,
wherein the moving bed bioreactors contact the water either before or after the water has passed through the at least one of the one or more filters but before the water contacts the one or more aerators;
wherein the subsystem is configured to discharge the oxygenated water into each of first ends of the one or more raceway tanks, each of the one or more raceway tanks having a plurality of virtual cells produced by rotating hydraulic flow patterns disposed along a corresponding raceway tank, via a plurality of discharge manifolds;
wherein the oxygenated water flows along a length of the one or more raceway tanks in a laminar flow pattern; and
wherein the subsystem is configured to receive a first portion of deoxygenated water in the one or more raceway tanks from each of second ends of the one or more raceway tanks and a second portion of the deoxygenated water in the one or more raceway tanks from a plurality of drains each disposed in a respective cell of the plurality of virtual cells, the first ends being opposite of the second ends.

2. The subsystem of claim 1, wherein each of the one or more pumps is a propeller-driven pump or an airlift pump.

3. The subsystem for water purification of claim 1, wherein the at least one of the one or more filters removes suspended solid material, the one or more moving bed bioreactors contact the water either before or after the water has passed through the at least one of the one or more filters but before the water contacts the one or more aerators, the one or more aerators degas the water after it has passed through the at least one of the one or more filters and through the one or more moving bed bioreactors, and one or more vacuum air lifts removes suspended particles with sizes in a range of 0.3 µm to about 100 µm that have passed through the at least one of the one or more filters.

4. The subsystem for water purification of claim 1, wherein the subsystem for water purification includes the one or more moving bed bioreactors and wherein the one or more aerators degas the water after the water has passed through the one or more moving bed bioreactors.

5. The subsystem for water purification of claim 1, wherein the subsystem for water purification includes the one or more moving bed bioreactors and wherein the moving bed bioreactors contact the water before the water contacts the one or more aerators.

6. The subsystem for water purification of claim 1, wherein one or more vacuum air lifts are configured to remove suspended particles with sizes in a range of 0.3 µm to 100 µm that have passed through the at least one of the one or more filters.

7. The subsystem for water purification of claim 1, wherein the one or more pumps are further configured to lift the water between 40 centimeters and 60 centimeters.

8. The subsystem for water purification of claim 1, wherein, after the one or more pumps lifts the water, the subsystem is configured to circulate at least a portion of the water back to the one or more pumps.

9. The subsystem for water purification of claim 1, further comprising the one or more raceway tanks each including:
   the plurality of discharge manifolds disposed along sidewalls of the corresponding raceway tank; and
   the plurality of drains.

* * * * *